United States Patent
Krishnaswamy et al.

(10) Patent No.: US 11,625,315 B2
(45) Date of Patent: Apr. 11, 2023

(54) SOFTWARE REGRESSION RECOVERY VIA AUTOMATED DETECTION OF PROBLEM CHANGE LISTS

(71) Applicant: Microsoft Technology Licensing, LLC, Redmond, WA (US)

(72) Inventors: Chandramouleeswaran Krishnaswamy, Bellevue, WA (US); Neetha Sumana Tuluri, Sammamish, WA (US); Rahul Nigam, Bothell, WA (US); Parminder Pal Singh, Redmond, WA (US); Mark R. Gilbert, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 811 days.

(21) Appl. No.: 16/424,720

(22) Filed: May 29, 2019

(65) Prior Publication Data
US 2020/0379875 A1    Dec. 3, 2020

(51) Int. Cl.
G06F 11/00 (2006.01)
G06F 11/36 (2006.01)
G06F 8/65 (2018.01)

(52) U.S. Cl.
CPC ............. *G06F 11/364* (2013.01); *G06F 8/65* (2013.01); *G06F 11/3616* (2013.01)

(58) Field of Classification Search
CPC .. G06F 11/3495; G06F 11/302; G06F 16/182; G06F 11/364
See application file for complete search history.

(56) References Cited

U.S. PATENT DOCUMENTS 7,506,312 B1  3/2009  Girolami-Rose et al.
9,122,558 B2  9/2015  Ewington et al.
(Continued)

FOREIGN PATENT DOCUMENTS

WO    2016160381 A1    10/2016

OTHER PUBLICATIONS

Kogel, Maximilian, "Towards software configuration management for unified models", In Proceedings of the international workshop on Comparison and versioning of software models, May 17, 2008, pp. 19-24.
(Continued)

*Primary Examiner* — Amine Riad
(74) *Attorney, Agent, or Firm* — Newport IP, LLC; Leonard J. Hope

(57) ABSTRACT

Systems and methods for automatically recovering from software regression in a cloud computing environment. One example method includes determining, with an electronic processor, that a batch software update has been applied to the cloud computing environment. The method includes, in response to determining that a batch software update has been applied, transmitting a problem request to an event listener server. The method includes receiving, from the event listener server, a problem statement including a stack trace. The method includes determining, based on the stack trace, a software feature indicator. The method includes transmitting the software feature indicator to a root cause analyzer. The method includes receiving, from the root cause analyzer, a change list indicator and a relevancy score associated with the change list indicator. The method includes performing a mitigation action based on the change list indicator when the relevancy score exceeds a relevancy threshold.

20 Claims, 3 Drawing Sheets

(56) References Cited

U.S. PATENT DOCUMENTS

| | | | |
|---|---|---|---|
| 9,454,465 | B1 | 9/2016 | Jhoney et al. |
| 9,542,176 | B2 | 1/2017 | Bird et al. |
| 10,175,978 | B2 | 1/2019 | Biddle et al. |
| 10,175,979 | B1 | 1/2019 | Elwell et al. |
| 10,657,023 | B1* | 5/2020 | Willson .............. G06F 11/3676 |
| 11,200,377 | B2* | 12/2021 | Benedict ................ G06N 20/00 |
| 2012/0204161 | A1 | 8/2012 | Ben-artzi et al. |
| 2014/0181793 | A1 | 6/2014 | Kaliappan |
| 2014/0310688 | A1* | 10/2014 | Granshaw ................. G06F 8/73 717/123 |
| 2015/0095892 | A1* | 4/2015 | Baggott ............. G06F 11/3616 717/127 |
| 2016/0292065 | A1* | 10/2016 | Thangamani ......... G06F 11/079 |
| 2017/0177468 | A1* | 6/2017 | Thangamani ....... G06F 11/3616 |
| 2017/0220610 | A1* | 8/2017 | Laethem ............... G06F 16/954 |
| 2020/0104110 | A1* | 4/2020 | Singh .................. G06F 11/1433 |
| 2020/0250070 | A1* | 8/2020 | Willson ............. G06F 11/3692 |
| 2021/0019209 | A1* | 1/2021 | Krishnaswamy ......... G06F 8/65 |

OTHER PUBLICATIONS

"Insights in Windows Upgrade Analytics accelerate Windows 10 upgrades", Retrieved from: https://www.microsoft.com/itshowcase/Article/Content/846/Insights-in-Windows-Upgrade-Analytics-accelerate-Windows-10-upgrades, Dec. 20, 2016, 9 Pages.

Mi, et al., "Performance Problems Diagnosis in Cloud Computing Systems by Mining Request Trace Logs", In IEEE Network Operations and Management Symposium, Apr. 16, 2012, pp. 893-899.

"International Search Report and Written Opinion Issued in PCT Application No. PCT/US2020/029035", dated Oct. 2, 2020, 17 Pages.

\* cited by examiner

SOFTWARE REGRESSION RECOVERY VIA AUTOMATED DETECTION OF PROBLEM CHANGE LISTS

FIELD

Embodiments described herein relate to automatic recovery of software regression and, in particular, to systems and methods for detecting problem change lists in cloud computing environments.

SUMMARY

Cloud computing platforms and other shared computing environments provide software applications and services to users via Internet and other networks. Applications that provide content creation, communication, and data storage and manipulation interact with one another and one or more hosting platforms. The software code for the applications and the platform is regularly updated to add features, correct errors, respond to user requests, and the like. In some cases, batch software updates are applied weekly that include many thousands of code changes across some or all of the applications and platforms. Application of the batched changes to software systems sometimes results in software regression and software performance regression.

One way regression can be repaired is by removing the offending code change. However, because of the many dependencies that exist among the software applications and hosting platforms, regression in one application may not be the result of a code change applied directly to that application. Identifying the offending code change involves analyzing large amounts of log files and exception traces, and many hours of investigation and troubleshooting to determine which of the thousands of code changes is causing the regression. Unless an entire batch update is reverted, the regression continues to negatively affect users of the system while a solution is being sought. However, this approach needlessly removes many changes that have improved, not harmed, system performance and user experience.

To help reduce the time software regression affects a system, while preserving effective software updates, embodiments described herein, among other things, automatically detect and recover from software regression after a batch software update. Using certain embodiments presented herein, software regression is detected and mitigated more quickly, resulting in a better user experience. Some embodiments described herein therefore result in more efficient use of computing system resources, and the improved operation of computing systems for users.

In particular, one embodiment provides a system for automatically recovering from software regression in a cloud computing environment. The system includes a resolution server communicatively coupled to the cloud computing environment. The resolution server includes an electronic processor. The electronic processor is configured to determine that a batch software update has been applied to the cloud computing environment. The electronic processor is configured to, in response to determining that a batch software update has been applied, transmit a problem request to an event listener server. The electronic processor is configured to receive, from the event listener server, a problem statement including a stack trace. The electronic processor is configured to determine, based on the stack trace, a software feature indicator. The electronic processor is configured to transmit the software feature indicator to a root cause analyzer. The electronic processor is configured to receive, from the root cause analyzer, a change list indicator and a relevancy score associated with the change list indicator. The electronic processor is configured to, when the relevancy score exceeds a relevancy threshold, perform a mitigation action based on the change list indicator.

Another embodiment provides a method for automatically recovering from software regression in a cloud computing environment. The method includes determining, with an electronic processor, that a batch software update has been applied to the cloud computing environment. The method includes, in response to determining that a batch software update has been applied, transmitting a problem request to an event listener server. The method includes receiving, from the event listener server, a problem statement including a stack trace. The method includes determining, based on the stack trace, a software feature indicator. The method includes transmitting the software feature indicator to a root cause analyzer. The method includes receiving, from the root cause analyzer, a change list indicator and a relevancy score associated with the change list indicator. The method includes performing a mitigation action based on the change list indicator when the relevancy score exceeds a relevancy threshold.

Yet another embodiment provides a non-transitory computer-readable medium including instructions executable by an electronic processor to perform a set of functions. The set of functions includes receiving, from a software updater, a notification indicating that the software updater has pushed a batch software update to the cloud computing environment and metadata associated with the batch software update. The set of functions includes transmitting a problem request to an event listener server in response to receiving the notification. The set of functions includes receiving, from the event listener server, a problem statement including a stack trace. The set of functions includes determining, based on the stack trace, a software feature indicator. The set of functions includes transmitting the software feature indicator to a root cause analyzer. The set of functions includes receiving, from the root cause analyzer, a change list indicator and a relevancy score associated with the change list indicator. The set of functions includes, when the relevancy score exceeds a relevancy threshold, determining, based on the metadata, whether a change list reversion mechanism exists for a change list identified by the change list indicator. The set of functions includes executing a change list reversion mechanism in response to determining that the change list reversion mechanism exists for the change list.

DETAILED DESCRIPTION

Figure 1:
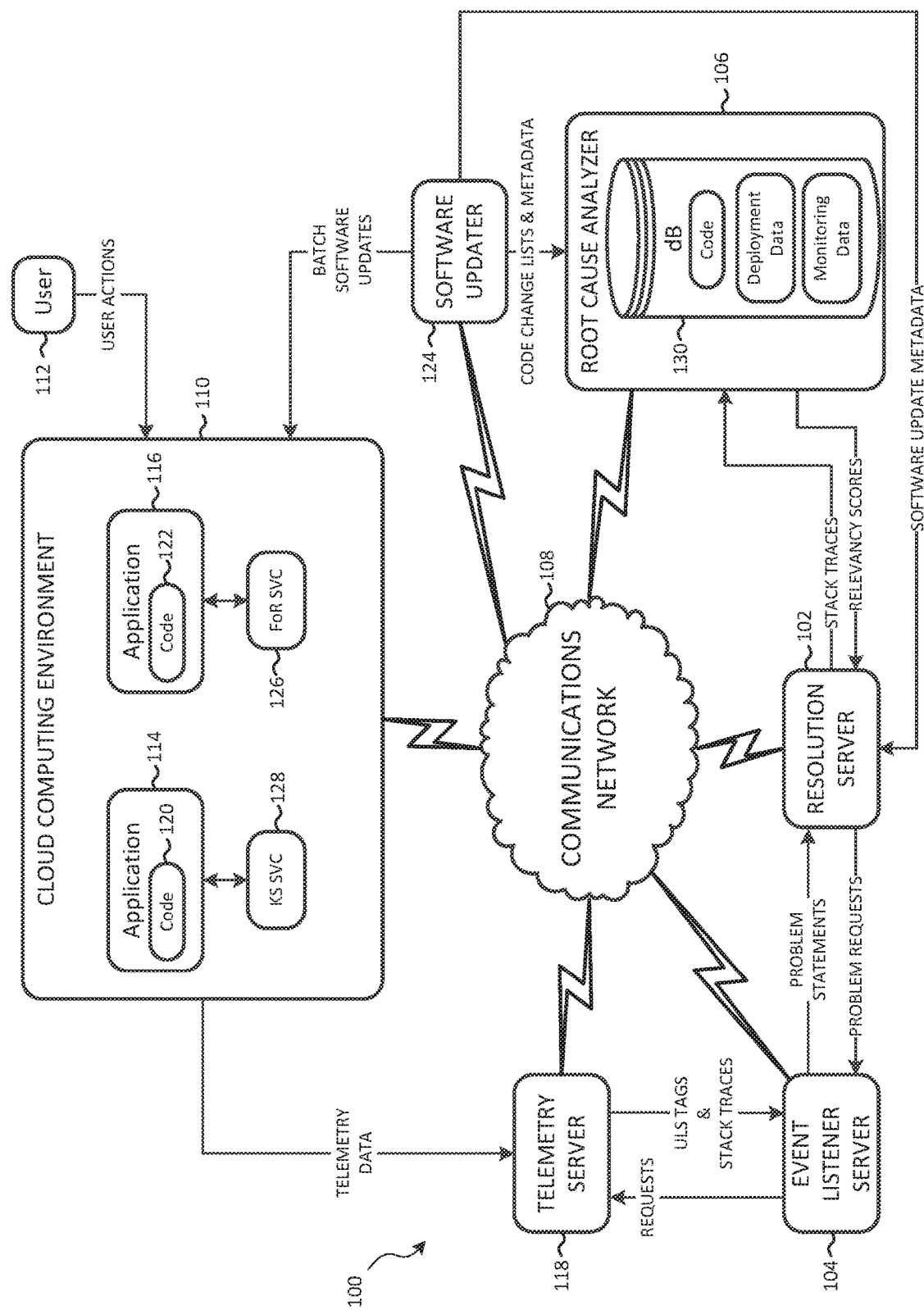
FIG. 1 schematically illustrates a system for automatically recovering from software regression, according to some embodiments.

One or more embodiments are described and illustrated in the following description and accompanying drawings. These embodiments are not limited to the specific details provided herein and may be modified in various ways.

Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first, second, third, etc., top and bottom, and the like may be used herein solely to distinguish one entity or action from another entity or action without necessarily requiring or implying any actual such relationship or order between such entities or actions.

As noted, batch software updates may result in software regressions that reduce computing system performance for affected users. Accordingly, embodiments described herein analyze telemetry data and use automated root cause analysis to identify and rollback offending software code changes and recover from software regression.

FIG. 1 illustrates an example system 100 for automatically recovering from software regression. The system 100 includes a resolution server 102, an event listener server 104, and a root cause analyzer 106. It should be understood that the system 100 is provided as one example and, in some embodiments, the system 100 may include fewer or additional components. For example, the system 100 may include multiple resolution servers 102, multiple event listener servers 104, multiple root cause analyzers 106, or combinations thereof.

The resolution server 102, the event listener server 104, the root cause analyzer 106, and other illustrated components are communicatively coupled via a communications network 108. The communications network 108 may be implemented using a wide area network (for example, the Internet), a local area network (for example, an Ethernet or Wi-Fi™ network), a cellular data network (for example, a Long Term Evolution (LTE™) network), and combinations or derivatives thereof.

Figure 2:
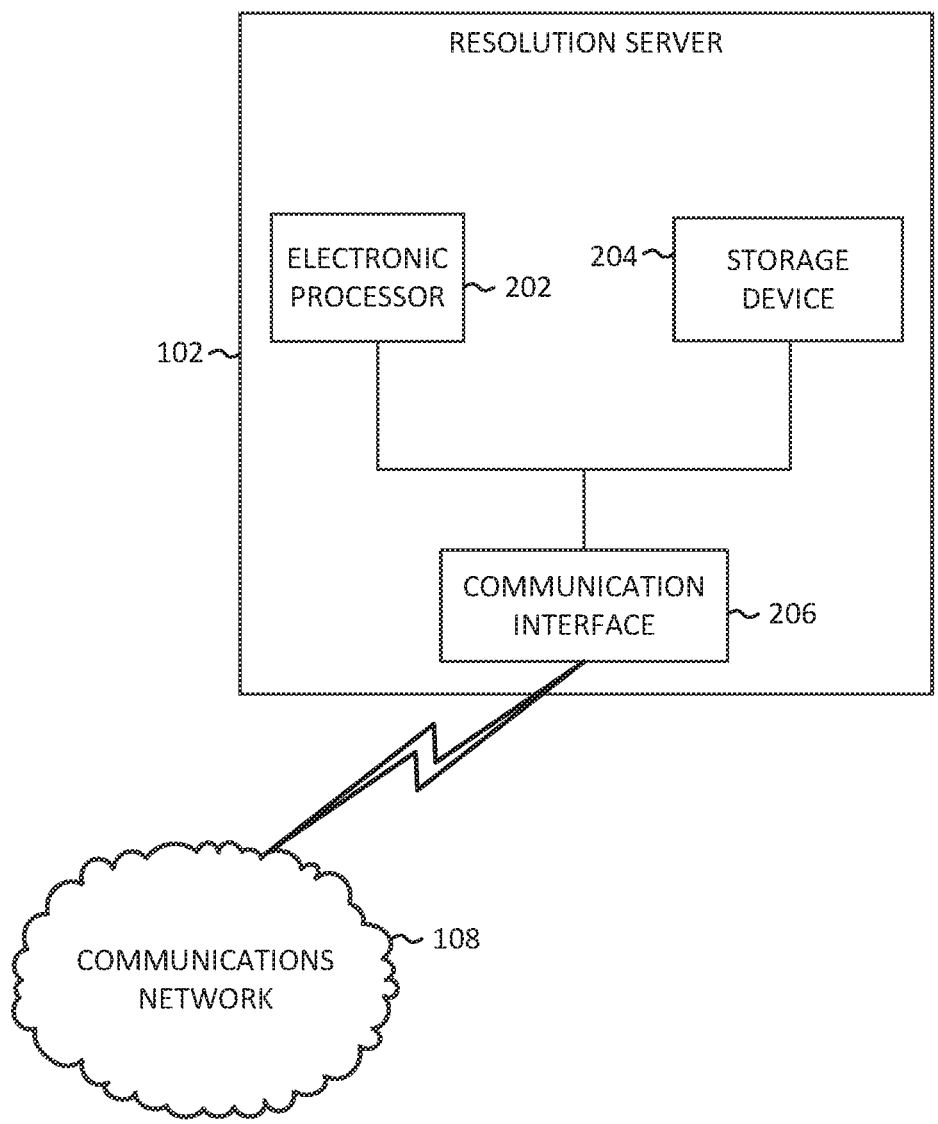
FIG. 2 schematically illustrates a resolution server of the system of FIG. 1, according to some embodiments.

FIG. 2 schematically illustrates the resolution server 102 in more detail. In the example provided in FIG. 2, the resolution server 102 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 108 and, optionally, one or more additional communication networks or connections. It should be understood that the resolution server 102 may include additional components than those illustrated in FIG. 2 in various configurations and may perform additional functionality than the functionality described in the present application. Also, it should be understood that the functionality described herein as being performed by the resolution server 102 may be distributed among multiple devices, such as multiple servers and may be provided through a cloud computing platform, accessible by components of the system 100 via the communications network 108.

The electronic processor 202, the storage device 204, and the communication interface 206 included in the resolution server 102 are communicatively coupled over one or more communication lines or buses, or combination thereof. The electronic processor 202 is configured to retrieve from the storage device 204 and execute, among other things, software to perform the methods described herein.

Returning to FIG. 1, the resolution server 102, the event listener server 104, and the root cause analyzer 106 exchange information via the communications network 108, and operate to automatically detect and recover from software regression, for example, in a cloud computing environment 110. The cloud computing environment 110 operates to provide users (for example, the user 112) with applications and other computing services remotely, via one or more networks. In some embodiments, the cloud computing environment 110 operates on a Microsoft® Azure® platform. In the illustrated example, the cloud computing environment 110 provides a first software application 114 and a second software application 116. Each of the first software application 114 and the second software application 116 may be a word processing application, a spreadsheet application, a communication application (for example, an email client application, a video chat application, and the like), a drawing application, a browser application, a web content editor, a video editor, an audio editor, an application that combines functions of the foregoing, or the like. In some embodiments, the first software application 114 and the second software application 116 are one of the Microsoft Office® and Office365® suites of applications (for example, Outlook®, Word®, Excel®, PowerPoint®, Internet Explorer®, and the like). In some embodiments, one or both of the first software application 114 and the second software application 116 are hosting, collaboration, or other software services, such as the OneDrive® and SharePoint® platforms produced by Microsoft Corporation.

As users (for example, the user 112) interact with the cloud computing environment 110 (including the first software application 114 and the second software application 116), telemetry data is generated. Telemetry data includes data points representing requests received by applications, dependencies (calls to external services), traces (for example, diagnostic logging), events, performance metrics, and the like. The telemetry data also includes data points representing exceptions, for example, errors associated with one or more operations of the plurality of the first software application 114 and the second software application 116. In some embodiments, the cloud computing environment 110 provides the telemetry data to a telemetry server 118 using, for example, a unified logging service (ULS). In some embodiments, the telemetry server 118 is a network-attached and accessible computer server that includes similar components as the resolution server 102. As described herein, the telemetry server 118 receives requests for telemetry data from the event listener server 104, and transmits telemetry data, including ULS tags and stack traces (for example, from software exceptions), to the event listener server 104.

The applications and services within the cloud computing environment 110 are provided by, among other things, electronic processors executing software code (for example, the code 120 of the first application 114 and the code 122 of the second application 116). Developers of the cloud computing environment patch and update the software code using a software updater 124. In some embodiments, the software updater 124 is a network accessible server that includes similar components as the resolution server 102. The software updater 124 operates to provide batch software updates to the cloud computing environment 110.

Batch software updates include many (for example, one thousand or more) changes to the code executed by the cloud computing environment 110. In some embodiments, the code changes are released using software flighting, for example, the flight on rails service 126. The flight on rails service 126 include information that defines which software features area enabled for which applications or services (for example, the second application 116). In some embodiments, the implementation of code changes is controlled using a killswitch service, for example, the killswitch service 128. The killswitch service 128 allows the cloud computing environment 110 to activate code changes in a controlled fashion. In some embodiments, the code 120 of the first application 114 may be configured to call the killswitch service 128 prior to executing certain portions of code (for example, recent changes or updates). For example, the killswitch service 128 may return a negative response to the first application 114, indicating that code in question should not be executed. Accordingly, the cloud computing environment 110 may selectively enable and disable changes added to the code of the applications by the software updater 124.

In some embodiments, the root cause analyzer 106 is a network-attached and accessible computer server that includes similar components as the resolution server 102. The root cause analyzer 106 includes a database 130. The database 130 electronically stores information relating to the cloud computing environment 110. In the embodiment illustrated, the database 130 is locally stored on the root cause analyzer 106. In alternative embodiments, the database 130 is a database housed on a suitable database server communicatively coupled to and accessible by the root cause analyzer 106. In some embodiments, the database 130 is part of a cloud-based database system external to the system 100 and accessible by the root cause analyzer 106 over one or more additional networks. In some embodiments, as illustrated in FIG. 1, the database 130 electronically stores or accesses code data, deployment data, and monitoring data.

The code data includes information about the code executed by the cloud computing environment 110. In some embodiments, code data includes information provided to the root cause analyzer 106 by the software updater 124, including a series of code change lists that make up the batch software updates and metadata associated with the batch software updates. In some embodiments, the metadata includes a plurality of key value pairs, each including a software feature and a code segment associated with the software feature, identifying which code segment implements which software feature. The metadata may also include data on change list owners (for example, contact information for a software developer or engineer responsible for the code changes in the change list). The metadata may also identify whether the software features are controlled using a change list reversion mechanism, for example, the flight on rails service 126 and the killswitch service 128. Deployment data includes information on the hardware and software platforms hosting the applications and services. Monitoring data includes alerts, exceptions, and performance metrics. In some embodiments, the monitoring data includes telemetry data, for example, received from the cloud computing environment 110 or the telemetry server 118.

In some embodiments, the root cause analyzer 106 uses various machine learning methods to analyze the data stored in the database 130. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data and progressively refine algorithms for data analytics.

Using machine learning, for example, a random forest analysis, the root cause analyzer 106 analyzes the change lists applied to the cloud computing environment 110. The root cause analyzer 106 determines dependencies among the software features and the code changes. The root cause analyzer 106 also analyzes what software features might be affected by what changes to determine, for each change list, a relevancy score. A relevancy score is a numerical value (for example, a decimal number, an integer, or a percentile) that indicates how relevant the code changes in a change list are to a particular software feature. For example, the higher the relevancy score of a change list with respect to a software feature, the more likely it is that the change list is responsible for a software regression involving that feature. In some embodiments, relevancy scores may be able to compare change lists. For example, a change list having a relevancy score greater than the relevancy score for another change list is considered more relevant to a particular software feature than the other change list.

Figure 3:
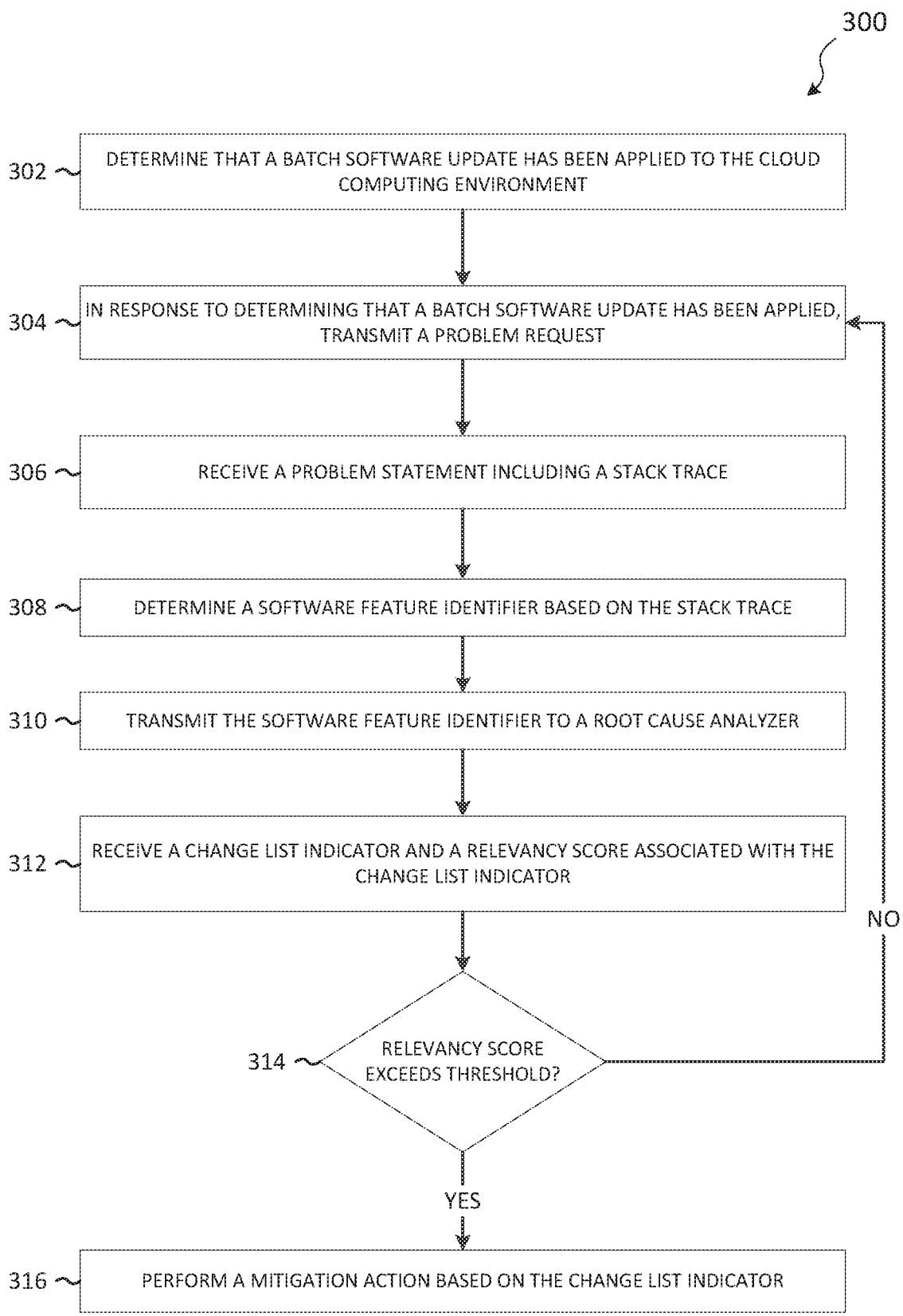
FIG. 3 is a flowchart illustrating a method performed by the system of FIG. 1 for automatically recovering from software regression in a cloud computing environment, according to some embodiments.

As noted, one or more code changes in a batch software update applied to a cloud computing environment may cause software regression. Manual troubleshooting of software regression is time consuming and inefficient, resulting in a degraded computing environment for users. Accordingly, to improve the user experience, it is desirable to automatically determine offending code changes and roll back those changes to improve the operation of the affected computing platforms. FIG. 3 illustrates an example method 300 for automatically recovering from software regression. The method 300 is described as being performed by the system 100, and, in particular, the resolution server 102 and the electronic processor 202. However, it should be understood that in some embodiments, portions of the method 300 may be performed by other devices, including for example, the event listener server 104 and the root cause analyzer 106. As an example, the method 300 is described in terms of the resolution server 102 and other components operating to monitor for and recover from software regression in a single cloud computing environment 110 updated by a single software updater 124. However, it should be understood that embodiments of the method 300 may be used with multiple quantities and types of computing environments and software updaters, arranged in various combinations. It should also be understood that embodiments of the method 300 may be used by embodiments of the system 100 that include more than one resolution server 102, event listener server 104, or root cause analyzer 106.

At block 302, the electronic processor 202 determines that a batch software update has been applied to the cloud computing environment. In some embodiments, the electronic processor 202 determines that a batch software update has been applied by receiving, from the software updater 124, a notification (for example, using a suitable electronic communication protocol or an API) indicating that the software updater 124 has pushed a batch software update to the cloud computing environment 110. In some embodiments, the resolution server 102 periodically polls the software updater or the cloud computing environment 110 to determine that a batch software update has been applied. In some embodiments, in addition to the notification, the resolution server 102 receives, from the software updater 124, metadata associated with the batch software update. In some embodiments, the metadata includes a plurality of key value pairs, each including a software feature and a code segment associated with the software feature. In some embodiments, the resolution server 102, upon determining that a batch software update has been applied, requests metadata for the batch update from the software updater 124 or the root cause analyzer 106.

At block 304, the electronic processor 202, in response to determining that a batch software update has been applied, transmits a problem request to the event listener server 104. For example, the electronic processor 202 may send the problem request using a suitable electronic communication protocol or an API. In some embodiments, in response to determining that the batch software update has been applied, the electronic processor 202 initializes a batch update timer. The batch update timer, and only transmits the problem request to the event listener server when the batch update timer exceeds an update timer threshold (for example, twenty-four to forty-eight hours). This allows time for sufficient telemetry data to be collected and for the root cause analyzer 106 to develop relevancy scores for the change lists contained in the batch software update.

The problem request is a request for information from the event listener server 104 pertaining to any problems occurring in the cloud computing environment since the batch software update was applied. Problems include critical exceptions generated by the cloud computing environment 110 and logged to the telemetry server 118, problems reported by users (for example, via a help desk or ticketing system), and the like. In some embodiments, the event listener server 104 periodically requests telemetry data from the telemetry server 118, and receives stack traces for critical exceptions along with ULS tags.

At block 306, the electronic processor 202 receives, from the event listener server 104, a problem statement, for example, including a stack trace for a critical exception. In some embodiments, the problem statement is based on a failure threshold (for example, a number of users affected by a problem). For example, the event listener server 104 may use the failure threshold to avoid reporting false positives or low impact problems to the resolution server 102. A false positive may be caused, for example, by user error, such as entry of a bad credential or corrupt data. In such case, a critical exception may be logged, but that exception may only occur once, or may occur several times but for just a single user (as determined by the ULS tag). In another case, multiple exceptions of a similar type may be received, each from a different user, exceeding the threshold for reporting to the resolution server 102.

At block 308, the electronic processor 202 determines, based on the stack trace, a software feature indicator. In some embodiments, the electronic processor 202 may determine the software feature indicator based on the stack trace and the plurality of key value pairs. For example, the electronic processor 202 may determine which code segment is referenced in the stack trace, and determine from that the associated software feature, using the key value pairs received with the metadata.

At block 310, the electronic processor 202 transmits the software feature indicator to a root cause analyzer 106 for example, using a suitable electronic communication protocol or an API.

At block 312, the electronic processor 202 receives, from the root cause analyzer, one or more change list indicators and one or more relevancy scores associated with the change list indicators. A change list indicator is a unique identifier associated with one of the change lists applied during the batch update. As noted above, the relevancy score is a measure of how likely it is that the change list identified is the cause of the problem reported.

At block 314, the electronic processor 202 determines whether the relevancy scores received exceed a relevancy threshold. In some embodiments, the relevancy threshold is set to approximately seventy percent. In some embodiments, when multiple change lists are received, the electronic processor 202 compares all relevancy scores exceeding the threshold and selects the change list identifier(s) having the highest relevancy score. In some embodiments, when none of the relevancy scores exceeds the threshold, the electronic processor 202 continues to request and process problem statements (at blocks 304-316).

When the relevancy score exceeds a relevancy threshold (at block 314), the electronic processor 202, at block 316, performs a mitigation action based on the change list indicator. In some embodiments, the electronic processor 202 determines, based on the metadata, whether a change list reversion mechanism exists for the change list identified by the change list indicator. In response to determining that a change list reversion mechanism does not exist for the change list, the electronic processor 202 performs a mitigation action by transmitting an electronic message to a change list owner of the offending change list. For example, an email or other electronic message may be sent to the change list owner, as identified in the metadata.

In some embodiments, in response to determining that a change list reversion mechanism does exist for the change list, the electronic processor 202 performs a mitigation by executing the change list reversion mechanism. For example, the electronic processor 202 may determine, based on the metadata, that the change list is governed by a flight on rails service, and issue a command to the flight on rails service to disable the change list. In another example, the electronic processor 202 may determine, based on the metadata, that the change list is governed by a killswitch service, and set a killswitch flag or flags associated with the change list. In some embodiments, the electronic processor 202 executes the change list reversion mechanism and transmits an electronic message to the change list owner indicating that the change list was reverted.

In some embodiments, the electronic processor 202, after performing a mitigation action, waits for a predetermined period of time, and polls the event listener server to determine if there are more problems reported for the same software features. When no problems have been reported after the predetermined time, electronic processor 202 may report (for example, to the change list owner, a cloud computing environment manager, a user, and the like) that the regression has been recovered. In some embodiments, when the same problems are still being reported after the predetermined time, the electronic processor 202 may adjust the relevancy threshold downward to capture more potentially offending change lists.

Various features and advantages of some embodiments are set forth in the following claims.

What is claimed is:

1. A system for automatically recovering from software regression in a cloud computing environment, the system comprising:
a resolution server communicatively coupled to the cloud computing environment, the resolution server including an electronic processor configured to:
determine that a batch software update has been applied to the cloud computing environment;
in response to determining that a batch software update has been applied, transmit a problem request to an event listener server;
receive, from the event listener server, a problem statement including a stack trace, the stack trace referencing a code segment;
determine, based on the code segment referenced by the stack trace, a software feature indicator;
transmit the software feature indicator to a root cause analyzer;
receive, from the root cause analyzer, a change list indicator and a relevancy score associated with the change list indicator; and
when the relevancy score exceeds a relevancy threshold, perform a mitigation action based on the change list indicator.

2. The system of claim 1, wherein the electronic processor is further configured to
in response to determining that the batch software update has been applied, initialize a batch update timer; and
transmit the problem request to the event listener server when the batch update timer exceeds an update timer threshold.

3. The system of claim 1, wherein the electronic processor is further configured to determine that a batch software update has been applied by receiving, from a software updater, a notification indicating that the software updater has pushed a batch software update to the cloud computing environment.

4. The system of claim 3, wherein the electronic processor is further configured to
receive, from the software updater, metadata associated with the batch software update, the metadata including a plurality of key value pairs, each including a software feature and a code segment associated with the software feature; and
determine the software feature indicator based on the stack trace and the plurality of key value pairs.

5. The system of claim 1, wherein the electronic processor is further configured to
receive, from the software updater, metadata associated with the batch software update;
determine, based on the metadata, whether a change list reversion mechanism exists for a change list identified by the change list indicator; and
in response to determining that a change list reversion mechanism does not exist for the change list, perform the mitigation action by transmitting an electronic message to a change list owner of the change list.

6. The system of claim 5, wherein the electronic processor is further configured to, in response to determining that a change list reversion mechanism exists for the change list, perform the mitigation action by executing the change list reversion mechanism.

7. The system of claim 6, wherein the change list reversion mechanism is one selected from the group consisting of a flight on rails service and a killswitch service.

8. The system of claim 1, wherein the problem statement is based on a failure threshold.

9. A method for automatically recovering from software regression in a cloud computing environment, the method comprising:
determining, with an electronic processor, that a batch software update has been applied to the cloud computing environment;
in response to determining that a batch software update has been applied, transmitting a problem request to an event listener server;
receiving, from the event listener server, a problem statement including a stack trace, the stack trace referencing a code segment;
determining, based on the code segment referenced by the stack trace, a software feature indicator;
transmitting the software feature indicator to a root cause analyzer;
receiving, from the root cause analyzer, a change list indicator and a relevancy score associated with the change list indicator; and
performing a mitigation action based on the change list indicator when the relevancy score exceeds a relevancy threshold.

10. The method of claim 9, further comprising;
in response to determining that the batch software update has been applied, initializing a batch update timer; and
transmitting the problem request to the event listener server when the batch update timer exceeds an update timer threshold.

11. The method of claim 9, wherein determining that a batch software update has been applied includes receiving, from a software updater, a notification indicating that the software updater has pushed a batch software update to the cloud computing environment.

12. The method of claim 11, further comprising:
receiving, from the software updater, metadata associated with the batch software update, the metadata including a plurality of key value pairs, each including a software feature and a code segment associated with the software feature; and
determining the software feature indicator based on the stack trace and the plurality of key value pairs.

13. The method of claim 9, further comprising:
receiving, from the software updater, metadata associated with the batch software update;
determining, based on the metadata, whether a change list reversion mechanism exists for a change list identified by the change list indicator; and
in response to determining that a change list reversion mechanism does not exist for the change list, perform the mitigation action by transmitting an electronic message to a change list owner of the change list.

14. The method of claim 13, further comprising:
in response to determining that a change list reversion mechanism exists for the offending change list, perform the mitigation action by executing the change list reversion mechanism and transmitting an electronic message to a change list owner of the change list indicating that the change list was reverted.

15. The method of claim 14, executing a change list reversion mechanism includes performing one selected from the group consisting of activating a flight on rails service and setting a killswitch service flag.

16. The method of claim 9, wherein the problem statement is based on a failure threshold.

17. The method of claim 9, further comprising:
determining the relevancy score using a machine learning analysis of batch software update metadata.

18. A non-transitory computer-readable medium including instructions executable by an electronic processor to perform a set of functions, the set of functions comprising:
receiving, from a software updater, a notification indicating that the software updater has pushed a batch software update to the cloud computing environment and metadata associated with the batch software update;
in response to receiving the notification, transmitting a problem request to an event listener server;
receiving, from the event listener server, a problem statement including a stack trace, the stack trace referencing a code segment;
determining, based on the code segment referenced in the stack trace, a software feature indicator;
transmitting the software feature indicator to a root cause analyzer;
receiving, from the root cause analyzer, a change list indicator and a relevancy score associated with the change list indicator;
when the relevancy score exceeds a relevancy threshold, determining, based on the metadata, whether a change list reversion mechanism exists for a change list identified by the change list indicator; and
in response to determining that a change list reversion mechanism exists for the change list, executing the change list reversion mechanism.

19. The non-transitory computer-readable medium of claim 18, the set of functions further comprising:
in response to determining that a change list reversion mechanism does not exist for the change list, transmitting an electronic message to a change list owner of the change list.

20. The non-transitory computer-readable medium of claim 18, the set of functions further comprising:
in response to receiving the notification that the batch software update has been applied, initializing a batch update timer; and
transmitting the problem request to the event listener server when the batch update timer exceeds an update timer threshold.

* * * * *